Patented Feb. 10, 1948

2,435,682

UNITED STATES PATENT OFFICE 2,435,682

AERATION OF BUTTERFAT-CONTAINING LIQUIDS

Charles A. Getz, Glen Ellyn, Ill., ass'gnor to Aeration Processes, Inc., Columbus, Ohio, a corporation of Ohio No Drawing. Application June 2, 1942, Serial No. 445,486

6 Claims. (Cl. 99—60)

This application is a continuation-in-part of my copending application, Serial No. 42,225, filed September 26, 1935, now Patent No. 2,294,172. The invention claimed in this application relates to aerated fat-containing food products containing nitrous oxide or similar gases of the class hereinafter described. While the preferred product is a composition having the general characteristics of whipped cream, it is a new product having characteristics which distinguish it from the conventional whipped creams.

Nitrous oxide gas is the best gas now known to me for making my new aerated fat-containing food products, and the invention will therefore first be explained with reference to its preferred specific embodiment, namely, a cream aerated with nitrous oxide gas. When the cream may be aerated with the nitrous oxide gas by different methods, the preferred method is to charge the cream in a closed container with nitrous oxide gas under a pressure of several atmospheres, agitating the cream with the compressed gas so as to bring the gas into solution in the cream, and then discharging the gas from the container through a suitable valved nozzle by means of which the pressure on the emerging stream of cream is suddenly released, resulting in a highly aerated product having the general characteristics of whipped cream.

Referring now to the specific embodiment of the invention and to the preferred way of producing my aerated product: Cream known as whipping cream, having a butter fat content of about 33% to 35%, is put into a container, such as that disclosed in the Smith Patent No. 2,281,604. The container is filled about half full of cream. Then the container is chaged with nitrous oxide gas at a pressure of between 25 to 200 pounds per square inch, depending upon the desired "overrun," the initial pressure of charging being preferably about 100 pounds to the square inch. The contents of the container are then agitated either by shaking, or in the case of shipping the containers, by the handling to which the containers are subjected. This causes the nitrous oxide gas to go into solution in the cream and the gas pressure of the container drops to about 50 to 60 pounds.

The cream in this condition is an intermediate product for the production of an aerated cream having the general consistency of whipped cream. This intermediate product contains in solution nitrous oxide gas under pressure. The intermediate product can be furnished in the containers by a distributor to the restaurant, drug store and domestic customers. All that remains for the customer to do is to open the discharge valve to emit the desired amount of aerated cream which is formed by the sudden release of pressure.

The nitrous oxide gas is readily soluble both in the butter fat content and in the watery serum or milk of the cream. Upon the sudden release of pressure incident to the discharge of the cream past the throttling valve of the container, the nitrous oxide gas comes out of its solution both in the butter fat and in the serum in the form of minute gas bubbles which are liberated suddenly. The butter fat in ordinary cream exists in the form of fairly large globules, varying somewhat according to the cow which produced the milk. The sudden formation of the internal gas bubbles from the nitrous oxide gas in solution in the butter fat appears to have an explosive effect upon the butter fat globules, and reduces them to smaller globules of a size comparable to that attained by homogenizing cream. The nitrous oxide coming suddenly out of solution forms minute gas bubbles which, because of the viscous, fatty character of the cream, remain as gas cells in the cream to form a stable, cellular, aerated product.

The product contains gas cells or bubbles of a narrow range of sizes compared with whipped creams which are made by the conventional methods into which air is beaten. The following table shows the distribution of bubbles by sizes and typical samples of an air aerated, mechanically whipped cream mix, and a cream mix dispensed under 40 pounds nitrous oxide pressure, and a cream mix dispensed under 60 pounds nitrous oxide pressure, these pressures producing creams representing, respectively, the overrun of a typical whipped cream and an overrun somewhat exceeding any obtainable by mechanically whipping cream:

| Diameter of gas bubbles in mm. | Mechanical | $N_2O$, 40 lbs. | $N_2O$, 60 lbs. |
|---|---|---|---|
| .01 | 25 | 1 | 0 |
| .02 | 37 | 15 | 0 |
| .03 | 39 | 48 | 8 |
| .04 | 34 | 69 | 31 |
| .05 | 26 | 44 | 41 |
| .06 | 13 | 21 | 42 |
| .07 | 8 | 5 | 46 |
| .08 | 11 | 1 | 35 |
| .09 | 11 | 0 | 21 |
| .10 | 2 | 0 | 11 |
| .11 | 4 | 0 | 3 |
| .12 | 0 | 0 | 0 |
| .13 | 7 | 0 | 0 |
| Larger up to .24 | 4 | 0 | 0 |

Often mechanically whipped cream contains much larger bubbles than those enumerated above, but the bubbles or gas cells of my aerated cream consist almost exclusively of those sizes listed above or of parallel ranges of distribution of size when dispensed under other pressures. The small size of the gas cells of my product gives it a firmer and more enduring body than that of the conventional cream made by the air inclusion processes.

In making whipped cream by the conventional methods in which air is beaten into cream, the aerating air is held in fairly large bubbles surrounded by butter fat particles, to the surfaces of which the cream serum is adsorbed. There is a tendency for the serum to "drain" from the whipped cream, resulting in a separation of a watery layer in the bottom of the dish. Such draining or bleeding away of the serum is largely overcome in my product. The minute globules of butter fat present a much greater surface area than that of the globules of butter fat in the natural cream and, therefore, provide a greatly multip'ied surface area upon which the serum is adsorbed and thereby held against draining. The nitrous oxide gas, furthermore, appears to promote a good adherence or adsorption of the serum to the butter fat particles.

Another difficulty encountered in making whipped cream in the conventional method is that of the formation of butter in the whipping process. This is because of the tendency of the particles of butter fat in the cream to "clump." My product is free of this clumping tendency. The nitrous oxide gas apparently has a tendency to prevent clumping.

Tests indicate that the nitrous oxide tends to inhibit the growth of noxious bacteria in the cream and to act as a preservative, but without the toxic effects associated with most preservatives. Conventional whipped cream made by the air process requires the aging of the cream usually from 24 to 48 hours prior to the whipping of the cream, which gives an opportunity for the bacteria counts to rise prior to the whipping operation. My product can be made from fresh and unaged cream, so that the product starts out with a lower bacteria count than that possible in conventional whipped cream.

Conventional whipped cream requires a butter fat content of about 35% as a minimum, an even at this minimum, draining of the serum occurs within a short time. My improved aerated cream may have a butter fat content considerably below that of conventional whipped cream. It can be made satisfactorily with a butter fat content of 30% or even lower.

While I have described above the preferred process of making my improved product, it may be made by other processes. For example, the nitrous oxide gas may be introduced into a flowing stream of cream and incorporated into the cream in the form of minute bubbles by a suitable mixing operation, such as passing the cream and nitrous oxide gas mixture through a homogenizing machine which will also break up or homogenize the butter fat globules of the cream. The nitrous oxide gas may be distributed into the cream and broken up into minute bubbles in other ways, preferably accompanied by a homogenization of the butter fat globules.

While it is preferred to homogenize the butter fat globules, the nitrous oxide may be incorporated into the cream without the breaking up of the butter fat globules into the minute particles characteristic of homogenization. For example, the nitrous oxide gas may be forced through the cream in the form of minute bubbles which are entrapped by the cream and which cause the nitrous oxide gas to be absorbed by the butter fat and cream serum to exert its beneficial effect in the finished product. Nitrous oxide may be incorporated into the cream in various other ways, such for example as mechanical agitation of the cream in an atmosphere of nitrous oxide gas at high, low or atmospheric pressures.

Another way in which the nitrous oxide gas may be incorporated into an aerated cream is by mixing with the cream finely divided crystals of hydrated nitrous oxide ($N_2O.4H_2O$), which break down to yield nitrous oxide gas. Also the nitrous oxide gas might be solidified and incorporated into the cream as a refrigerated solid. Irrespective of the specific method of incorporation, the nitrous oxide gas, which not only forms the gas cells but also remains in solution to some extent in the butter fat and cream serum, appears to exert certain beneficial effects above enumerated, such as tending to inhibit bacterial growth, promotion of adsorption of the serum by the butter fat particles, and tendency to prevent clumping.

While nitrous oxide alone may be used as the aerating gas, under some circumstances, it may be advantageous to use mixtures of gases. For example, nitrous oxide with a minor proportion, say about 20% or less, of cyclopropane, $$CH_2.CH_2.CH_2$$

difluordichlormethane (Freon), $C.Cl_2.F_2$ dimethyl ether, sometimes known as dimethyl oxide, $CH_3.O.CH_3$, or methyl chloride, $CH_3.Cl$, may be mixed with the nitrous oxide. Such mixture tends to increase the firmness and freedom from drainage of the product. In general, a mixture of two or more of the gases hereinbefore referred to tends to increase the overrun, firmness, and freedom from drainage of the product. The advantages of such mixtures are, however, somewhat theoretical from a production standpoint, since nitrous oxide alone is satisfactory.

The nitrous oxide need not be used in a pure form but may contain other gases so long as they do not interfere with the essential action of the nitrous oxide. For example, a minor amount of carbon dioxide mixed with nitrous oxide can be tolerated so long as the amount is not sufficient to cause an objectionable acid or biting taste to the product. Its use, however, is not recommended in an edible aerated cream.

While nitrous oxide is the preferred aerating gas, it may be substituted in whole or in part by cyclopropane, $CH_2.CH_2.CH_2$, difluordichlormethane (Freon), $C.Cl_2.F_2$, dimethyl ether, sometimes known as dimethyl oxide, $CH_3.O.CH_3$, or methyl chloride, $CH_3.Cl$. These gases are non-toxic, substantially neutral and substantially tasteless.

It will be understood, of course, that my whipped cream contains sweetening and flavoring, usually sugar and vanilla extract. It is not, however, necessary to employ foam stabilizers, such as gelatin, alginates, etc., sometimes used in an attempt to maintain the stability of an air aerated whipped cream and prevent drainage of the serum.

While the invention has been described with particular reference to a preferred product, namely, an aerated cream, it may be embodied in other aerated fat-containing food products, as for example, ice cream, salad dressings, mayonnaise and the like. In general, the processes described above in connection with the making of an aerated cream may be employed to incorporate the nitrous oxide or similar gas into other compositions, and the advantages flowing from the use of nitrous oxide in making aerated cream obtain for the most part in the making of other fat-containing food products.

While I have specifically described the preferred embodiment of my invention, it is to be understood that it may be otherwise embodied within the scope of the following claims.

I claim:

1. An aerated cream having the general consistency of whipped cream and having distributed therethrough minute gas cells containing nitrous oxide.

2. An aerated cream having the general consistency of whipped cream and having distributed therethrough minute gas cells containing a non-acid forming gas which is readily soluble in both the butter fat and the serum of the cream and which imparts substantially no odor or taste thereto.

3. An aerated cream of the general consistency of whipped cream, having homogenized butter fat globules and having distributed therethrough minute gas cells containing nitrous oxide, and characterized by a finer texture, firmer body and less drainage than that of conventional air aerated whipped cream of the same butter fat content.

4. An aerated fat-containing food product having distributed therethrough minute gas cells containing nitrous oxide.

5. An aerated fat-containing food product having distributed therethrough minute gas cells containing a non-acid forming gas which is readily soluble in said product and which imparts substantially no odor or taste thereto.

6. An aerated cream having the general consistency of whipped cream and having distributed therethrough minute gas cells containing difluordichlormethane.

CHARLES A. GETZ.

REFERENCES CITED

The following references are of record in the file of this patent:

UNITED STATES PATENTS

| Number | Name | Date |
|---|---|---|
| 1,570,975 | Sweeney | Jan. 26, 1926 |
| 1,852,267 | Roush | Apr. 5, 1932 |
| 1,889,236 | Burmeister | Nov. 29, 1932 |
| 2,155,260 | Diller | Apr. 18, 1939 |
| 2,250,300 | Goosmann | July 22, 1941 |
| 2,290,214 | Smith | July 21, 1942 |
| 2,343,767 | Getz | Mar. 7, 1944 |